Feb. 1, 1938.   J. P. BRUNT ET AL   2,106,907
BOX
Filed Jan. 6, 1936   4 Sheets-Sheet 1

Inventors:
John P. Brunt &
Edward E. Maston

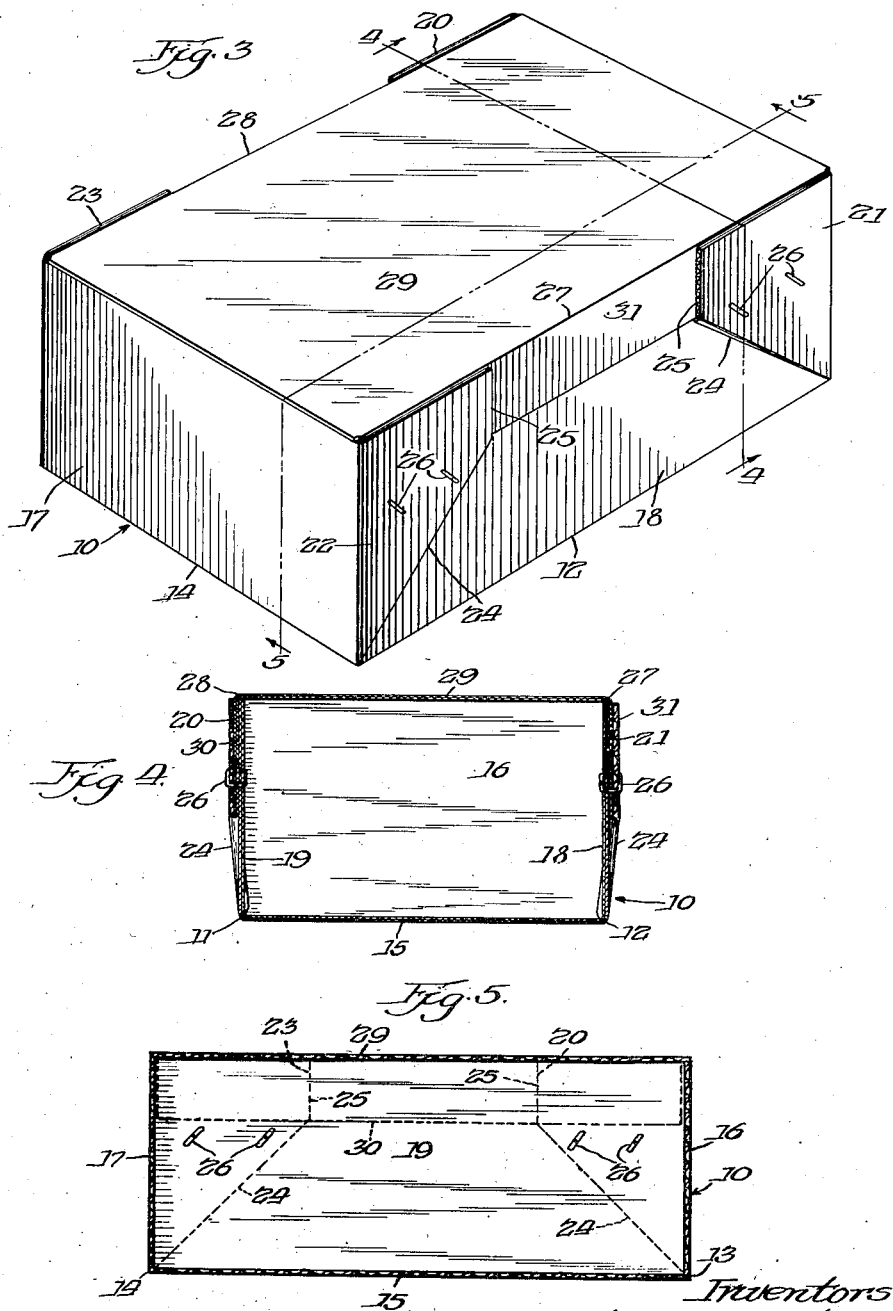

Feb. 1, 1938. J. P. BRUNT ET AL 2,106,907
BOX
Filed Jan. 6, 1936 4 Sheets-Sheet 3

Inventors:
John P. Brunt &
Edward E. Maston

Feb. 1, 1938.   J. P. BRUNT ET AL   2,106,907
BOX
Filed Jan. 6, 1936   4 Sheets-Sheet 4

Inventors:
John P. Brunt &
Edward E. Maston

Patented Feb. 1, 1938

2,106,907

UNITED STATES PATENT OFFICE 2,106,907

BOX

John P. Brunt, Chicago, and Edward E. Maston, Wilmette, Ill., assignors to Brunt & Company, Chicago, Ill., a corporation of Delaware Application January 6, 1936, Serial No. 57,772

9 Claims. (Cl. 229—31)

Our invention relates to a box which comprises a lower or receptacle portion made of a single piece of corrugated fibreboard, solid fibreboard, paper board or any other similar material which can be creased and folded or rendered foldable in any manner, and having corner portions which are folded on themselves and then folded along the sides of the box forming in effect a tripled corner box, and a cover therefor made of a single piece of material such as described above, with fold lines extending longitudinally thereof whereby wing portions are formed which are adapted to be tucked into channels along the sides of the box at the corners thereof, thereby providing what may be described as a tuck top, triple corner box.

Another and further object of our invention is the provision of a box which is dirt-proof and substantially water tight, and which may be used for a variety of purposes including food products which lose their moisture when exposed to the air, and which preserves and protects the contents of the box during transportation and which also can be used as receptacles for display purposes for the contents of the box during sale.

Another and further object of our invention is the provision of a container which is substantial in construction, easily and cheaply manufactured, and easily sealed to retain the top in position, and which provides a container in which the cover may be detached entirely from the box or detached at one side of the box only so that the opposite side acts as a hinge, the under side of the cover having advertising matter thereon if desired, and which at the close of the day can be closed over the container, thereby protecting the contents of the box.

Another and further object of our invention is the provision of a box which can be shipped in flat form and knock-down condition, and easily and quickly assembled at the plant or place of use, thereby resulting in a saving in freight rates, quickness in handling, and the like, which is not possible to secure with boxes shipped in final completed form.

These and other objects of the invention will be more fully and better understood by reference to the accompanying drawings, and in which—

Figure 3 is a perspective view of the box in assembled relation, with the cover applied;

Figure 4 is a vertical, sectional view on line 4—4 of Figure 3;

Figure 5 is a longitudinal sectional view on line 5—5 of Figure 3;

Figure 1:
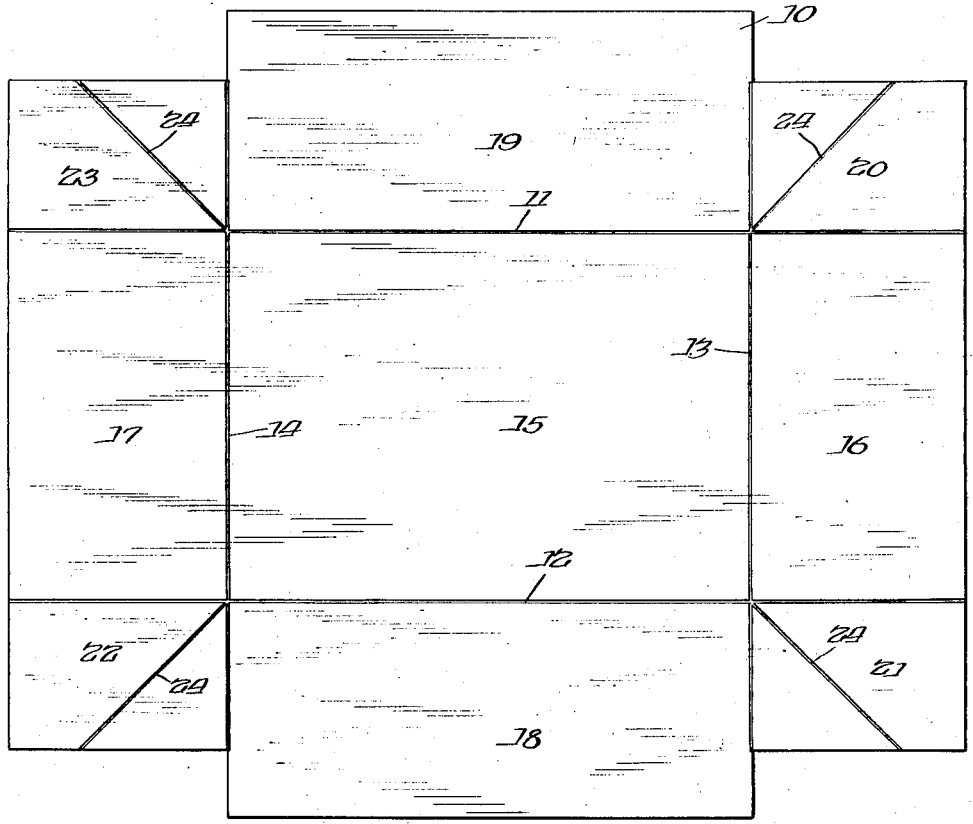
Figure 1 is a plan view of a blank forming the bottom or receptacle portion of our improved box.

Referring now specifically to the drawings and in which like reference characters refer to like parts throughout, the receptacle or bottom portion of the box is formed from a blank 10, having longitudinally extending fold lines 11 and 12 and transverse fold lines 13 and 14 formed in the blank, whereby a bottom section 15, end portions 16 and 17 are formed, and side portions 18 and 19. Corner portions 20, 21, 22 and 23 are formed as an integral portion of the blank 10 and have the fold lines 11 and 12 passing along one of their sides, the fold lines 13 and 14 passing along their ends. In addition, diagonal fold lines 24, 24 are provided which extend through the corner members 20, 21, 22 and 23, and along which these corner portions are folded upon themselves when the bottom or receptacle portion of the box is formed.

In the form shown in Figure 1, the corner portions and the ends are slightly less in length than the combined width of the bottom portion 15 and the side portions 18 and 19, while the fold lines 24 passing in a diagonal direction across the corner portions terminate in the sides of these corner portions a short distance from the end, which produces vertically extending edges 25, 25 on the corner portions when the lower portion of the box is formed, and in effect divides the corner sections into a triangular portion and a larger portion of irregular shape, and which is folded over the triangular portion when the corners are secured to the sides of the box. The triangular section in effect forms a spacer for the outer section, the edge of the cover, when placed in position, meeting the edge of the triangular section at its upper side.

In the formation of the receptacle or lower portion of the box, the blank 10 is folded along the lines 11 and 12 and 13 and 14, so that the sides and end portions are in vertical position, and the corner sections 20, 21, 22 and 23 are at the same time folded upon themselves along the fold lines 24 and then turned alongside the side portions 18 and 19 of the box. Staples 26, 26 are inserted through the two thicknesses of the corner portions 20, 21, 22 and 23 and through the side walls 18 and 19 of the box, these staples being inserted at a point below the upper edge of the side portions 18 and 19, whereby the channels are formed between the sides 18 and 19 and the corners of the box 20, 21, 22 and 23, for the reception of a portion of the cover of the box, as hereinafter described, thereby forming triple corners in the box.

Figure 2:
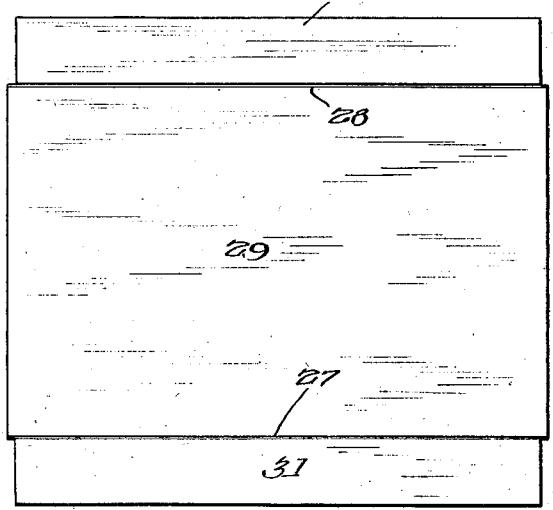
Figure 2 is a plan view of the cover.

The cover illustrated in Figure 2 is composed of a single foldable piece of fibreboard, paper board or the like, having longitudinal fold lines 27 and 28, thereby forming a cover 29 having wing portions 30 and 31. When the box is formed these wing portions 30 and 31 are turned downward along the fold lines 27 and 28 and inserted in the channels formed between the corner portions 20, 21, 22 and 23 and the sides of the box 18 and 19. It will be noted that the wing portions 30 are slightly less in length than the cover 29 so that the cover 29 extends over the upper edges of the ends 16 and 17 of the box, thereby completely covering the open portion of the lower receptacle. If desired, a strip of gummed paper or the like may be placed on the ends of the cover portion and the sides of the ends 16 and 17 at their upper edges, effectively sealing the box against the admission of dirt, moisture or the like, and providing an easier means for holding the cover in position for shipment, handling, and the like, although the frictional engagement of the wing portions of the cover is sufficient to hold it in place for ordinary purposes.

Figure 6:
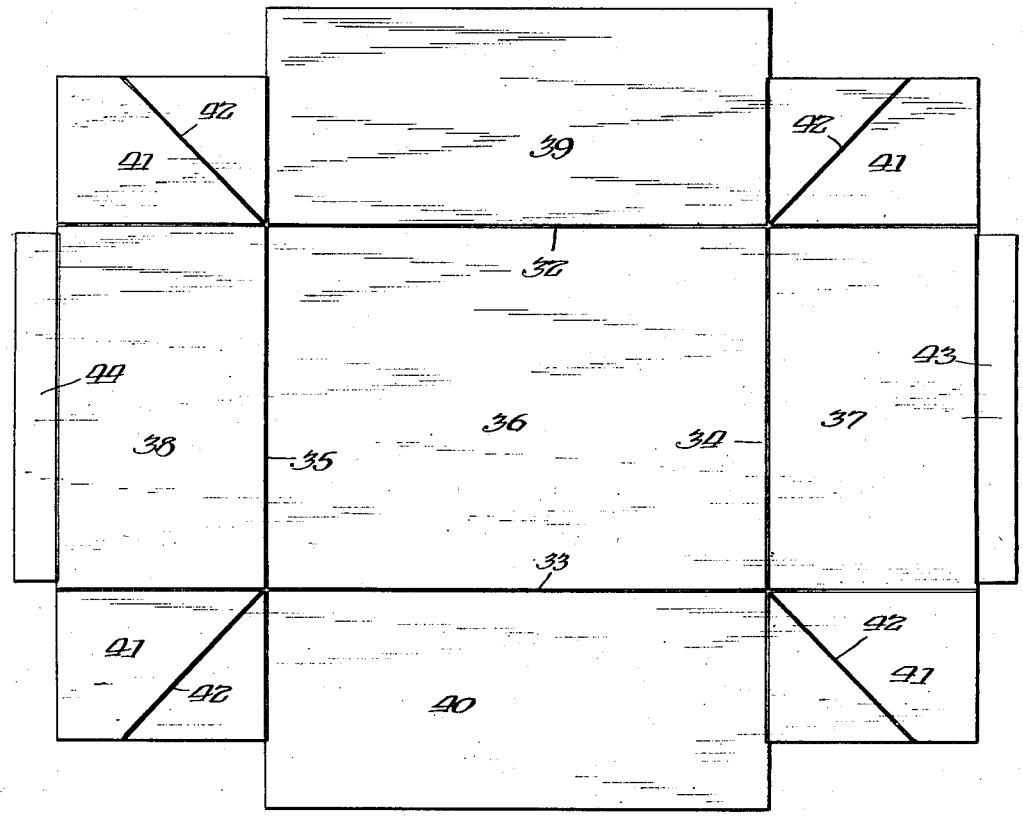
Figure 6 is a plan view of the bottom of a blank for forming the lower section of the box in a slightly modified form.
Figure 7:
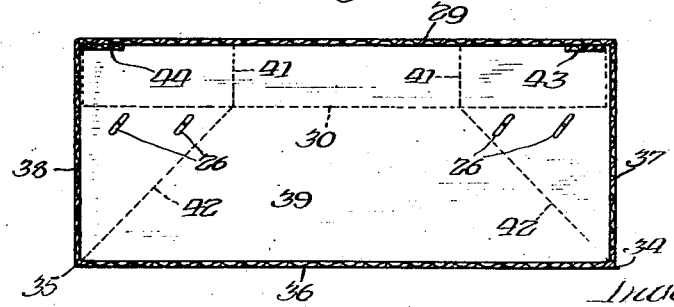
Figure 7 is a longitudinal sectional view of a box formed from the blank illustrated in Figure 6, and the cover as illustrated in Figure 2.

In Figure 6 a blank similar to that illustrated in Figure 1 is shown, having longitudinally extending fold lines 32 and 33 thereon, with transversely extending fold lines 34 and 35 whereby a bottom 36, end portions 37 and 38 are formed, with side portions 39 and 40. Corner portions 41, 41 are provided having diagonally extending fold lines 42 therein of the same form and in substantially the same position as shown in Figure 1, with projecting portions 43 and 44 being shown as extensions of the end portions 37 and 38, and which in the form of device shown in assembled relation (Figure 7), form flanges for the support of the cover 29. The projecting portions 43 and 44 also provide an additional seal at the end of the box to prevent possibility of moisture or the like entering under the edges of the cover, and a more firm sealing means for the cover than if the cover would rest directly upon the edges of the end portions of the lower container.

The assembling of the lower section of the box is performed in exactly the same manner as that heretofore described with respect to the formation and assembling of the blank illustrated in Figure 1, and forms a box which is exactly like that illustrated in Figure 3 except that it has the projections 43 and 44 integrally formed with the ends for the purpose of supporting the cover as illustrated in Figure 2.

Figure 8:
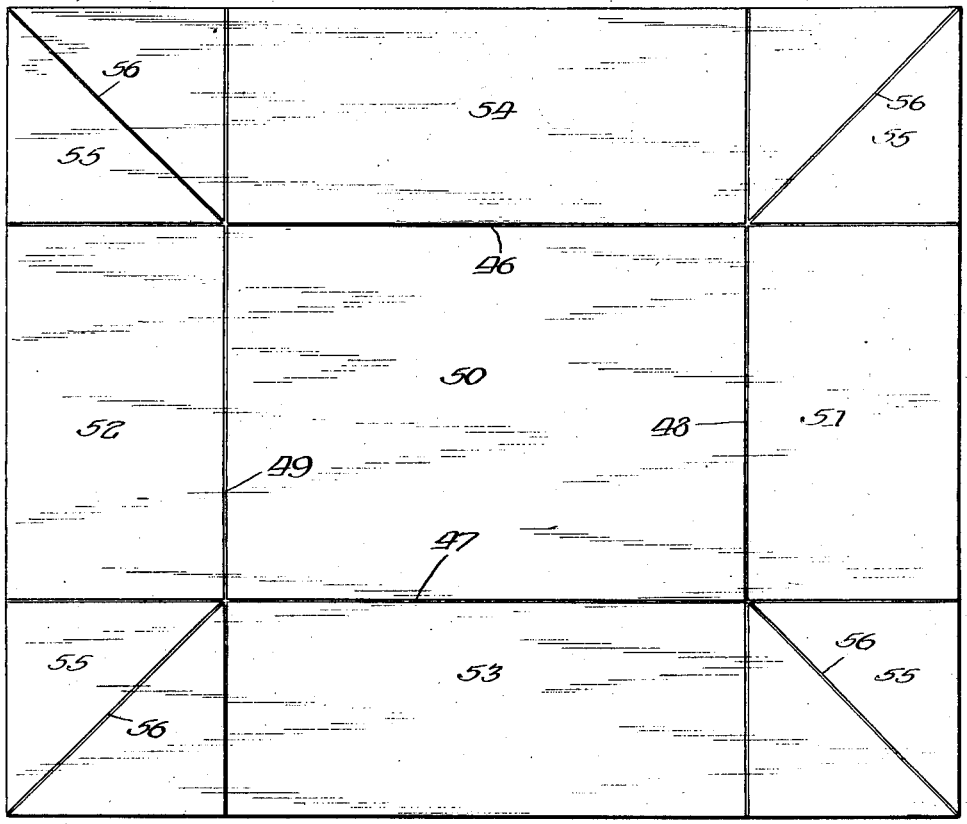
Figure 8 is a plan view of a box blank of still another modified form of our improved invention.
Figure 9:
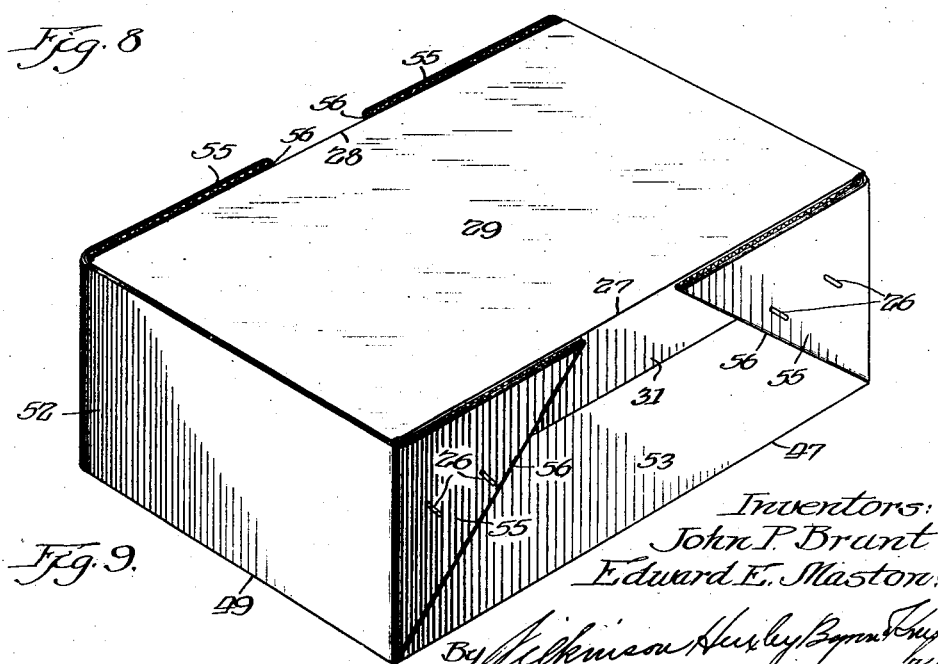
Figure 9 is a perspective view of a box and cover made from the blank illustrated in Figure 8 and the cover illustrated in Figure 2.

In Figure 8 a still further modified form is illustrated, this form being substantially like the forms illustrated in Figures 1 and 6 except that the corner portions are in the form of square sections and have the fold lines extending diagonally thereacross from corner to corner. This blank has longitudinally extending fold lines 46 and 47 therein, with transversely extending fold lines 48 and 49 forming the bottom section 50, with ends 51 and 52 and sides 53 and 54, with corner portions 55, 55 being formed having diagonally extending fold lines 56, 56 extending thereacross from corner to corner and producing in effect pointed corner portions as shown particularly in the assembled relation of the box in Figure 9. In this form the entire corner section is bent outward slightly so the edge of the cover is inserted between the corner portions and the sides of the box after the corner portions are secured thereto.

The assembly of the box is performed in exactly the same manner in that the box blank is folded along the longitudinal fold lines 46 and 47 and transversely extending fold lines 48 and 49, with the corners being folded diagonally and turned around alongside the sides 53 and 54 of the box and stapled by means of the staples 26, 26 at a point remote from the upper edge of the box, whereby a channel is formed for the reception of the wing portions 30 and 31 of the cover 29.

It will thus be understood that in the formation and assembly of this box as heretofore described, a unitary structure is formed comprising a lower or receptacle section and a cover therefor, of two blanks, and which when folded and assembled is easily and quickly done, these blanks being quickly and easily assembled in the user's plant, the blanks themselves being shipped in flat form for the purpose of economy, ease of handling, saving in freight rates and the like.

While we have described more or less precisely the details of construction, we do not wish to be understood as limiting ourselves thereto, as we contemplate changes in form and the proportion of parts and the substitution of equivalents as circumstances may suggest or render expedient without departing from the spirit or the scope of our invention.

We claim:

1. A container comprising a lower section formed of a unitary piece of foldable material into a bottom portion, side and end portions, and having corner portions folded upon themselves into substantial triangular form and secured to the sides of the box at a point in spaced relation from the upper edge, and a cover adapted to be received over the side portions and inside of a portion of each of said corner portions.

2. A container comprising a lower section formed of a unitary piece of foldable material into a bottom portion, side and end portions, and having corner portions folded upon themselves into substantial triangular form and secured to the sides of the box at a point in spaced relation from the upper edge, and a cover adapted to be received over the side portions and inside of a portion of each of said corner portions, the combined width of the end and corner portions being less than the combined width of the bottom and side portions.

3. A container comprising a lower section formed of a unitary rectangular shaped piece of foldable material having small cutout sections at the corners thereof, formed into a bottom, side and end portions, and having corner portions folded upon themselves and bent alongside of said side portions and secured thereto at a point spaced from the top thereof whereby channels are formed between said sides and corner portions, and a cover having wing portions adapted to be fitted into said channels.

4. A container comprising a lower section formed of a unitary rectangular shaped piece of foldable material having small cutout sections at the corners thereof, formed into a bottom, side and end portions, and having corner portions folded upon themselves and bent alongside of said side portions and secured thereto at a point spaced from the top thereof whereby channels are formed between said sides and corner portions, and a cover having wing portions along its sides adapted to be fitted into said channels.

5. A container comprising a lower section formed of a unitary rectangular shaped piece of foldable material having small cutout sections at the corners thereof, formed into a bottom, side and end portions, and having corner portions folded upon themselves and bent alongside of said side portions, the cut-out sections providing channels for the reception of a portion of the cover, securing means passing through said folded corner portions and the side walls, and a cover for said receptacle having portions fitting into the said channels.

6. A container comprising a lower section formed of a unitary rectangular shaped piece of foldable material having small cutout sections at the corners thereof, formed into a bottom, side and end portions, and having corner portions folded upon themselves and bent alongside of said side portions whereby channels are formed in said cutout sections for the reception of portions of the cover, securing means passing through said folded corner portions and the side walls in spaced relation from the upper edge of said side walls, and a cover for said receptacle having portions adapted to be received into the said channels.

7. A container comprising a unitary piece of foldable material formed into bottom, side and end walls, and having corner portions folded upon themselves and against the face of one pair of walls and secured to the walls against which said corner portions are folded at a point spaced from the top thereof, and a cover having wing portions adapted to be received between a portion of each of the corner portions and the face of the walls against which the corner portions are folded.

8. A container comprising a unitary piece of foldable material formed into bottom, side and end walls, and having corner portions folded upon themselves and against the face of one pair of walls and secured to the walls against which said corner portions are folded at a point spaced from the top thereof, and a cover having portions adapted to be received between a portion of each of the corner portions and the face of the walls against which the corner portions are folded.

9. A container comprising a unitary piece of foldable material formed into bottom, side and end walls and having corner portions folded upon themselves and against the face of one pair of walls and secured to the walls against which said corner portions are folded at a point spaced from the top thereof, and a cover having wing portions adapted to be received between a portion of each of the corner portions and the face of the enclosure walls against which the corner portions are folded, the corner portions having cut-out portions forming channels for the reception of the wings on the cover when the lower section is in completed form.

JOHN P. BRUNT.
EDWARD E. MASTON.